United States Patent [19]

Kacheria

[11] Patent Number: 5,779,353
[45] Date of Patent: Jul. 14, 1998

[54] WEATHER-PROTECTED LIGHTING APPARATUS AND METHOD

[75] Inventor: Nilesh P. Kacheria, Bombay, India

[73] Assignee: Fiberstars, Inc., Fremont, Calif.

[21] Appl. No.: 633,157

[22] Filed: Apr. 16, 1996

[51] Int. Cl.$^6$ ........................................ F21V 9/00
[52] U.S. Cl. .................... 362/293; 362/32; 362/294; 362/373
[58] Field of Search .................... 362/26, 27, 32, 362/294, 373, 293

[56] References Cited

U.S. PATENT DOCUMENTS

| | | | |
|---|---|---|---|
| 4,922,385 | 5/1990 | Awai | 362/32 |
| 5,099,399 | 3/1992 | Miller et al. | 362/32 |
| 5,111,367 | 5/1992 | Churchill | 362/32 |
| 5,479,322 | 12/1995 | Kacheria | 362/32 |

OTHER PUBLICATIONS

American Products Fiberworks Installation and Service Manual, pp. 1–25, Mar. 12, 1996.
Fiberstars 201 Illuminator Specification and Submittal Sheet, 1995.

*Primary Examiner*—Stephen F. Husar
*Attorney, Agent, or Firm*—Fenwick & West LLP

[57] ABSTRACT

Lighting fixtures and lighting system and method for illuminating optical fibers and surrounding environment incorporate light sources into separate weather-resistant housings that provide improved air flow for cooling the internal light source, and include provisions for illuminating lengths of optical fibers by separate spaced light sources with synchronized sequences of interposed color filters to promote uniform color illumination of lengths of optical fibers by the separate fixtures. Spurious light flux from the light source within the housing that is not focused on ends of optical fibers emanates from a weather-resistant globe on the fixture through a baffle that controls the intensity and distribution of illuminating flux through the globe, and that confines the flow of cooling air within the housing for more efficient cooling of the light source within the housing.

6 Claims, 4 Drawing Sheets 5,779,353

1

WEATHER-PROTECTED LIGHTING APPARATUS AND METHOD

FIELD OF THE INVENTION

This invention relates to lighting fixtures and more particularly to outdoor lighting fixtures for illuminating optical fibers as well as the surrounding environment for improved efficiency of illumination and immunity from adverse effects of weather.

BACKGROUND OF THE INVENTION

Certain known lighting fixtures adapted for operation in outdoor environments to illuminate optical fibers commonly employ exterior shields about the internal components to provide protection from rain and water splashed from adjacent pools or ponds. These lighting fixtures typically are configured in low profile, and are intended to inhibit spurious illumination from the internal light source from emanating from the light box to the adjacent area. Fixtures of this type are disclosed in the literature.

Other known lighting fixtures for outdoor environments are arranged to illuminate optical fibers and also utilize the spurious illumination from inside the fixture to illuminate the surrounding environment. These fixtures are configured in tall, vertical orientation to provide adequate illumination to adjacent pathways and the surrounding environment, but are vulnerable to collision with people and moving equipment such as carts and bicycles, and to associated damage from such collisions.

SUMMARY OF THE INVENTION

In accordance with one embodiment of the present invention, a lighting fixture for illuminating optical fibers and for illuminating the surrounding environment includes a low-profile housing that is immune to damage from rain and splashing water from adjacent pools or ponds, and that provides adequate and uniform lighting for the surrounding environment. The housing encloses a light source that is focused on the ends of a plurality of optical fibers which are oriented upwardly from the bottom of the housing. The light source also provides spurious light flux not focused on the ends of the optical fibers for reflection about within the housing to exit through an optical and thermal baffle and light-diffusing globe to provide illumination around the surrounding region. The optical fibers may be positioned in decorative arrays around a pool or pond, or in other decorative manner for attractive visual effects. A color wheel is interposed between the light source and the ends of the optical fibers to enhance the visual effects of the decorative array of optical fibers with colored light emanating from the fibers. Synchronizing circuitry is provided in selected ones of the fixtures to align the orientation of the color wheels per housing so that successive lengths of optical fibers emanating from different fixtures may nevertheless appear to be illuminated from the same light source of varying color. Cooling air is drawn into the housing, circulated around the ends of the optical fibers and the light source, and then channeled out of the fixture under a pressure differential established by a fan positioned along the cooling path of air flowing through the fixture. Multiple fixtures positioned to illuminate opposite ends of connected fiber optic cables may be synchronized in color sequence of illumination by initial color sensors or by color-wheel control switches to provide uniform color illumination at both ends of a fiber optic cable.

2

Figure 1:
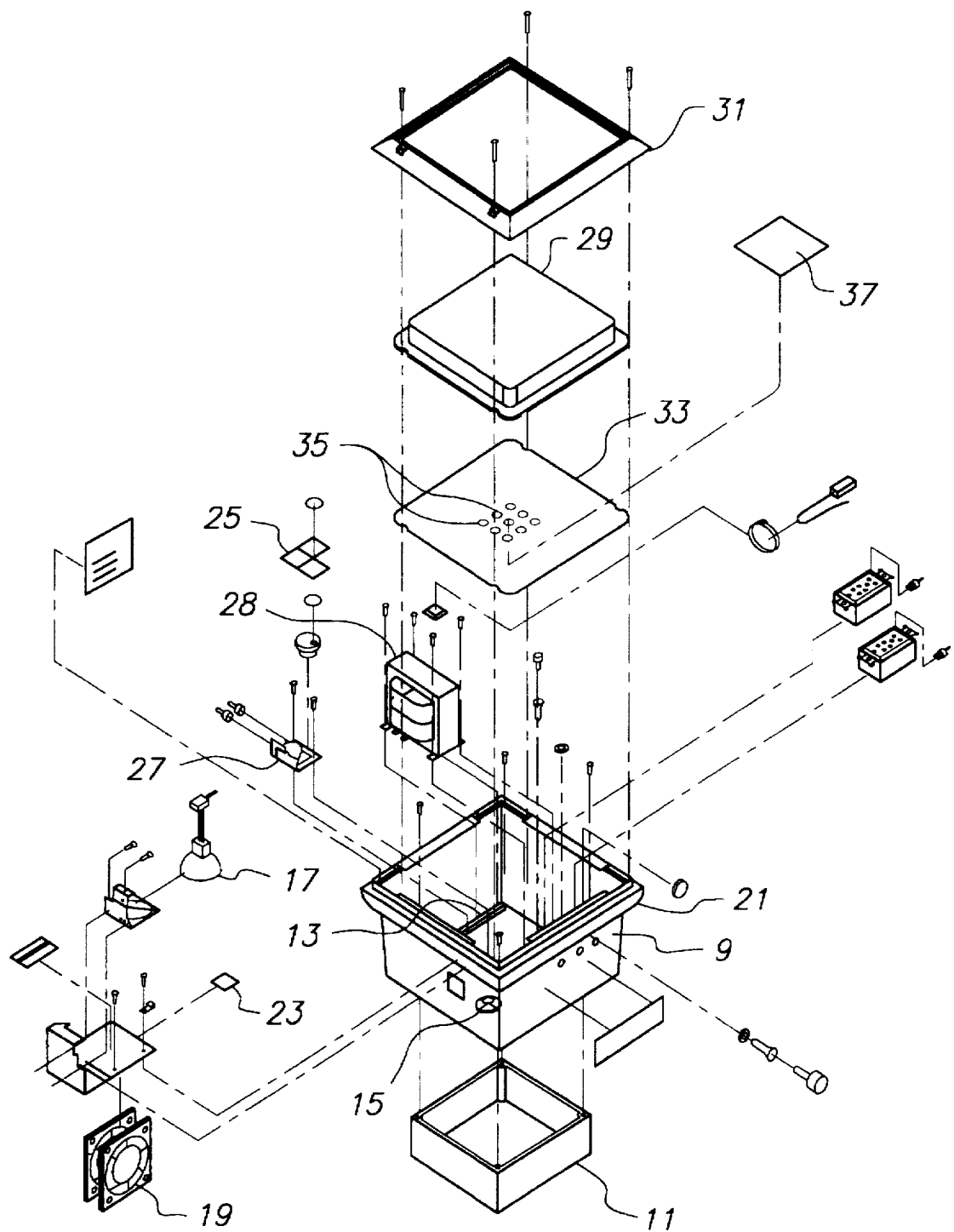
FIG. 1 is an exploded perspective view of the lighting fixture showing the orientation of assembled components.
Figure 2:
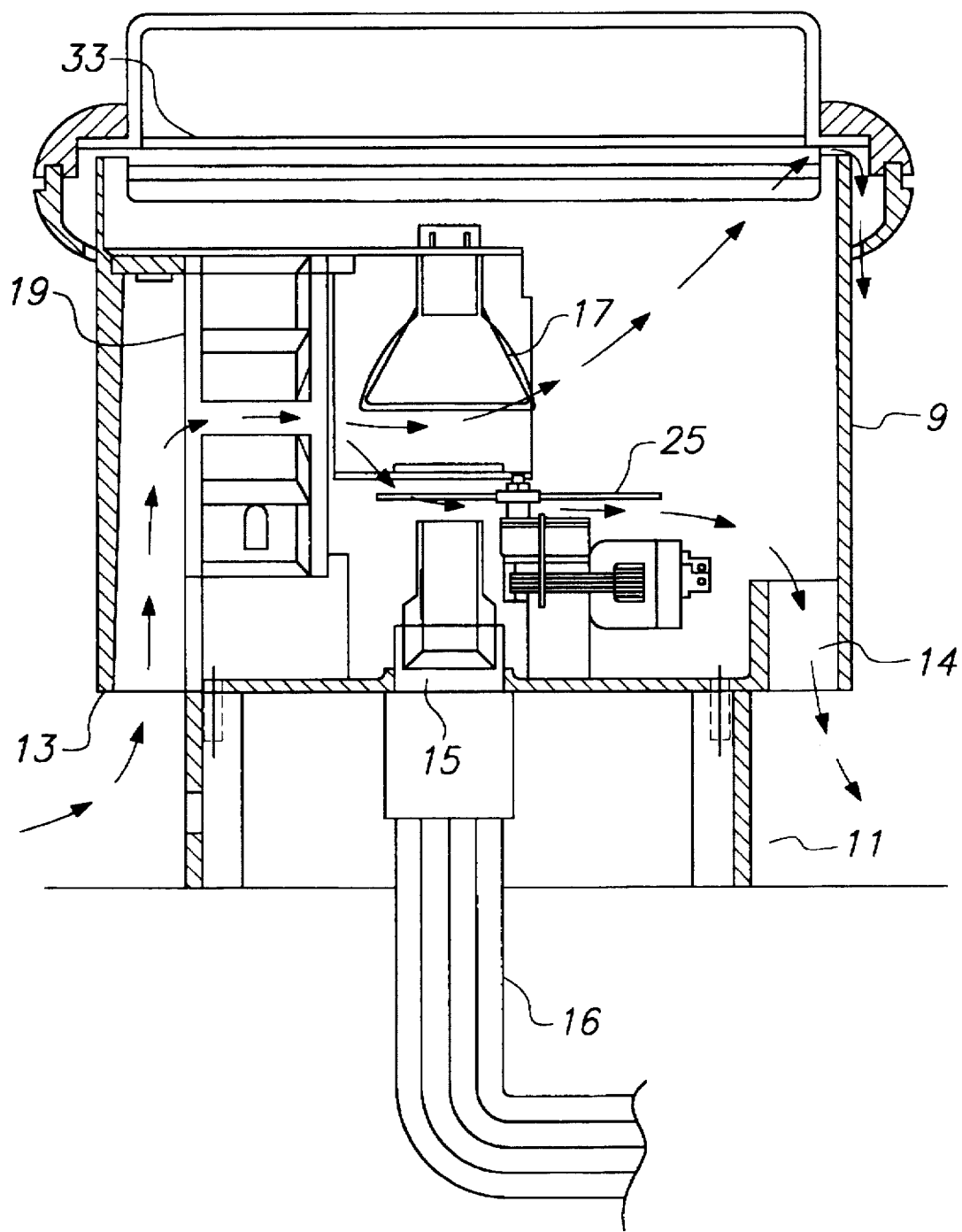
Figure 3:
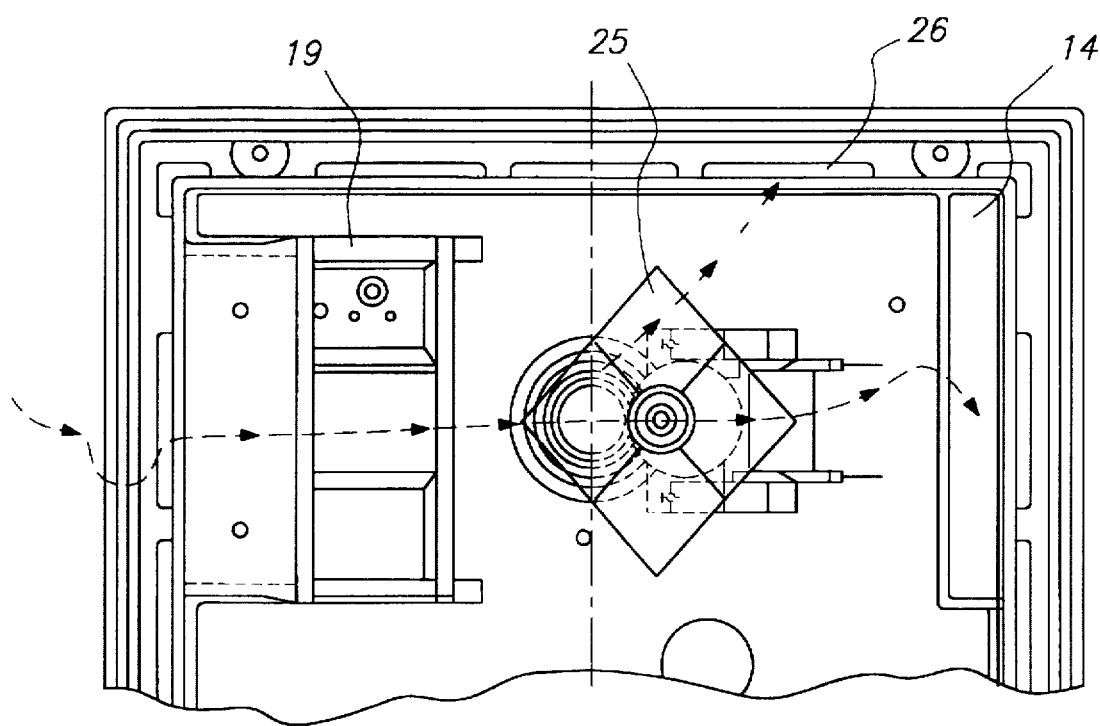
Figure 4:
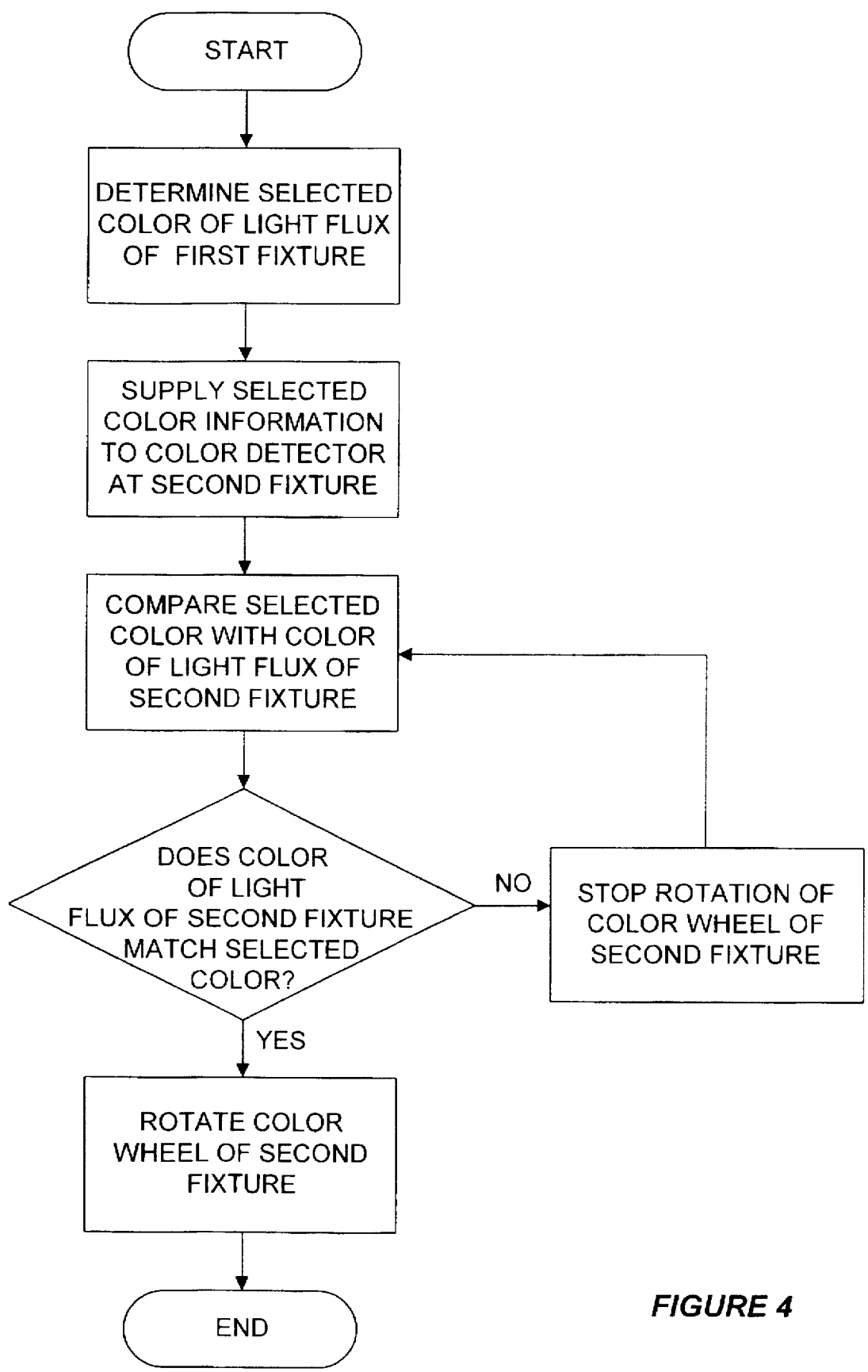

FIG. 2 is a side cross-sectional view of the fixture according to the embodiment of FIG. 1;

FIG. 3 is a top cross-sectional view of a portion of the lighting fixture without the lamp mounting bracket and lamp; and FIG. 4 is a flow chart illustrating a method of synchronizing the color-wheel sequences and orientations of two fixtures of the embodiment illustrated in FIGS. 1, 2, and 3 used to illuminate both ends of optical fibers assembled between housings of the fixtures.

DESCRIPTION OF THE PREFERRED EMBODIMENT

Referring now to FIG. 1, there is shown an exploded view of components that are assembled to form the illustrated embodiment of the present invention. Specifically, there is shown an outer, generally rectangular housing 9 that may be formed of aluminum or plastic, or the like, that is impervious to normal weather conditions to be encountered in an exterior lighting application. An elevating hollow rim 11 is disposed beneath the housing 9 to facilitate installation of power and optical cables from beneath the housing 9. The rim 11 also provides aesthetic enhancement to the fixture. The rim 11 is recessed from the lower outer dimensions of the housing 9 to provide an air inlet/outlet port 13 adjacent one wall of the housing 9 near a corner thereof. The rim 11 is also recessed to provide a second air inlet/outlet port 14 (shown in FIG. 2) adjacent the one side wall that forms a common wall between inlet/outlet port 13 and inlet/outlet port 14. An aperture 15 in the bottom of the housing 9 receives a bundle of optical fibers therein aligned in generally vertical orientation with ends thereof disposed to be illuminated by a lamp 17 that is mounted to focus substantially the entire light flux in the area of the ends of optical fibers protruding into the housing 9 through the aperture 15. The lamp 17 may be surrounded by a reflector to help focus light flux on the ends of the optical fibers. A fan 19 is positioned within the housing 9 to draw air into the fixture through an inlet/outlet port and to circulate the inlet air in a manner which will be discussed with reference to FIGS. 2 and 3. A diachroic filter 23 may be mounted between the lamp 17 and the ends of optical fibers disposed through the aperture 15 in order to diminish thermal radiation from the lamp 17 and associated deterioration of plastic or glass optical fibers (commonly formed of plastic material such as methyl-methacrylate, or other thermoplastic or glass materials.) Additionally, a color wheel 25 including a plurality of optical color filters may be mounted intermediate the lamp 17 and ends of optical fibers disposed through aperture 15. The color wheel 25 may be rotated at a suitable rate by synchronous motor 27 to present aesthetically pleasing changes of color in fibers mounted in, and illuminated by, the fixture of FIG. 1. A transformer 28 may be mounted in the housing 9 to receive electrical power for operating one or more of the lamp 17, the fan 19, and the color-wheel motor 27 on low A.C. or D.C. voltage, and the power connections may be brought into the housing 9 through the bottom thereof in accordance with standard electrical code requirements for outdoor lighting fixtures.

Referring now to FIGS. 2 and 3, there are shown side and top cross-sectional views, respectively, of the fixture of FIG. 1 illustrating one embodiment of the air flow within the housing 9 for controlled cooling of the fixture and the associated components. The fan 19 draws ambient air through inlet/outlet port 13, circulates the inlet air around ends of a bundle 16 of optical fibers, around the lamp 17, and then out of the housing through apertures 26 disposed in the upper rim 21 that projects outwardly beyond the walls of the housing 9, and through inlet/outlet port 14. In an alternate embodiment, the rotation of the fan 19 is reversed so that the fan 19 draws ambient air through the apertures 26 and inlet/outlet port 14, circulates the inlet air around ends of the bundle 16 of optical fibers, around the lamp 17, and then out of the housing through inlet/outlet port 13. In both embodiments, the ends of the bundle 16 of optical fibers may be cooled by the flow of air, thus reducing damaging effects to the optical fibers due to radiant heating from the lamp 17. Also, the flow of air cools the lamp 17 to further reduce possible thermally-related damage to the optical fibers or other associated components of the fixture.

In each embodiment of the present invention, light flux from the lamp 17 is focused on the ends of the optical fibers aligned therewith. The light flux not coupled to optical fibers, including the portion of light flux that may transmit through a reflector in an embodiment that includes a reflector surrounding lamp 17, may reflect from the inner walls and bottom of the housing 9, and from other surfaces and components within the housing 9, to illuminate the upper globe 29 that overlays the upper rim 21 to form a water tight seal therewith. The globe 29 may be formed of translucent glass or plastic material that is held in place on housing 9 by the frame 31 that is attached thereto. For embodiment of the fixture in which the globe 29 is formed of plastic material, a heat baffle and optical barrier 33 may be formed of metal and may be disposed beneath the globe 29 and above the lamp 17 to inhibit thermal deterioration of the plastic material from which the globe 29 is formed. Thus, heated air within the housing 9, which is not circulated out of the housing 9 through inlet/outlet port 13 or inlet/outlet port 14, is circulated out of the housing 9 through apertures 26 that are positioned beneath the baffle 33. Optical apertures 35 are arranged within an area of the baffle 33 to provide substantially uniformly distributed reflected light flux from within the housing 9 to the translucent globe 29. In this way, the globe 29 appears to be uniformly illuminated from within the housing 9, and substantially all of the heated air within the housing 9 is thermally isolated from the globe 29. An optional optical color filter 37 may also be positioned intermediate the optical apertures 35 and the lamp 17 to provide selected color illumination of the globe 29.

In operation, two fixtures of the embodiment illustrated in FIGS. 1, 2 and 3 may be used to illuminate both ends of optical fibers assembled between housings 9. In this way, light flux introduced into the optical fibers may emanate laterally from the walls of the fibers to provide decorative illumination in lineal array along pathways, pool borders, and the like, in known manner. In embodiments of the fixture including synchronous motor control of color variations of the light flux supplied to both ends of optical fibers installed between fixtures, care should be taken to initially synchronize the color-wheel sequences and orientations so that both ends of the optical fibers receive light flux of substantially the same color, sequence and timing each time two fixtures are powered on from the same line source of electrical power.

Referring now to FIG. 4, there is shown a flow chart illustrating a method of synchronizing the color-wheel sequences and orientations of two fixtures of the embodiment illustrated in FIGS. 1, 2, and 3 used to illuminate ends of optical fibers assembled between housings 9. Specifically, synchronous motor 27 of a first lighting fixture utilizes a color detector disposed to detect light flux of a selected color and positioned adjacent the ends of the optical fibers to be illuminated for sensing the selected color of light flux appearing at the ends of the optical fibers. The color detector then supplies an output signal to a comparator circuit for indicating the selected color of light flux. Next, the comparator circuit sends a signal indicating the selected color to the color detector of the second fixture. The color detector of the second fixture sends a continuous signal to the comparator circuit while it is detecting the selected color of light flux. During this time the color wheel of the second fixture continues to rotate at its previously-set speed. The color detector of the second lighting fixture stops sending a signal during the time it detects a color of light flux that does not match the selected color light flux of the first lighting fixture. The comparator circuit then send a signal to the synchronous motor 27 of the second lighting fixture which causes the color wheel 25 of the second fixture to stop rotating until it receives a signal from the comparator circuit that the colors of light flux from the two fixtures match. In this way, the associated ends of lengths of optical fibers disposed between the separate lamps 17 receive light flux of substantially the same color, sequence and timing each time two fixtures are powered on from the same line source of electrical power. For configurations which utilize more than two lighting fixtures to illuminate ends of optical fibers, the light flux colors of the other fixtures are similarly synchronized with the light flux color of the first fixture.

Alternatively, a sensor for detecting the orientation of the color wheel 25 may be used instead of a color detector. In this embodiment, the steps of the synchronizing method shown in the flow chart of FIG. 4 are the same, except the signals are responsive to the orientation of color wheels 25 and the orientation of the color wheel of the first fixture is compared with the orientation of the color wheels of the other fixtures.

In each embodiment of the present invention, the fixture may be elevated above ground level by placing the elevating hollow rim 11 on a cement cinder block which is hollow to facilitate installation of power and optical cables.

Therefore, the lighting fixture of the present invention is configured in a low profile housing which illuminates the surrounding environment as well as optical fibers, is weather-resistant, efficiently cools the lighting source, and can be operated in a manner which produces light flux of various color changes synchronized with color changes of light flux from other lighting fixtures of the present invention.

What is claimed is:
1. Lighting apparatus comprising:
   a housing including a lower surface and intersecting side walls elevating from the lower surface to upper edges and surrounding an inner region of the housing;
   a first aperture near the lower surface of the housing adjacent one side wall;
   a second aperture near the lower surface and adjacent the one side wall that forms a common wall between the apertures along a path of air flow therebetween;
   a light source disposed within the housing above the lower surface intermediate the apertures and oriented to direct a portion of light flux therefrom toward a focal location near the lower surface;
   a fan disposed within the housing intermediate the light source and the first aperture for establishing a pressure differential within the housing to promote flow of air into the housing through the first or second aperture, past the light source, and out of the second or first aperture, respectively;

a mounting attached to the housing for supporting a plurality of optical fibers with ends thereof disposed near the focal location of the light source;

a light transmissive globe disposed above the upper edges of the side walls to emit therethrough another portion of light flux from the light source that is not focused toward the focal location; and a baffle interposed between the light source and the globe and including at least one optical aperture therein for passing unfocused light flux from within the housing to the globe.

2. Lighting apparatus according to claim 1 wherein said globe is fitted to the upper edges of the side walls to form therewith a substantially weather-resistant enclosure about the housing.

3. Lighting apparatus according to claim 1 comprising a plurality of color filters interposed between the light source and the ends of optical fibers at the focal location for selectively altering the color of illuminating light flux supplied to the optical fibers.

4. Lighting apparatus according to claim 1 wherein said light source is disposed adjacent said one side wall which forms with said baffle a confined path for air flow therealong from said -first or second aperture, through said fan, past the light source, and out through the second or first aperture, respectively.

5. Lighting apparatus according to claim 1 wherein said baffle is disposed at an elevation above the lower surface of the housing that is substantially aligned with the upper edges of the side walls to form a thermal barrier for heat within the housing and to confine air flow along the path therein between the first and second apertures.

6. Lighting apparatus according to claim 5 wherein the baffle includes a plurality of optical apertures therein that are selectively disposed about the area thereof confined within the upper edges of the side walls to provide substantially uniform light flux emanating from the globe.

* * * * *